(12) United States Patent
Hikazudani et al.

(10) Patent No.: US 9,457,334 B2
(45) Date of Patent: Oct. 4, 2016

(54) HYDROGEN PRODUCTION PROCESS

(71) Applicants: Hitachi Zosen Corporation, Osaka (JP); Kyoto University, Kyoto-shi (JP)

(72) Inventors: Susumu Hikazudani, Osaka (JP); Atsushi Wakui, Osaka (JP); Kazuyuki Hirao, Kyoto (JP); Toshimi Fukui, Kyoto (JP); Junko Nakamoto, Kyoto (JP); Heidy H. Visbal Mendoza, Kyoto (JP)

(73) Assignees: Hitachi Zosen Corporation, Osaka-shi (JP); Kyoto University, Kyoto-shi (JP)

( * ) Notice: Subject to any disclaimer, the term of this patent is extended or adjusted under 35 U.S.C. 154(b) by 0 days.

(21) Appl. No.: 14/759,104

(22) PCT Filed: Jan. 9, 2014

(86) PCT No.: PCT/JP2014/050207
§ 371 (c)(1),
(2) Date: Jul. 2, 2015

(87) PCT Pub. No.: WO2014/112422
PCT Pub. Date: Jul. 24, 2014

(65) Prior Publication Data
US 2015/0336075 A1    Nov. 26, 2015

(30) Foreign Application Priority Data
Jan. 17, 2013   (JP) ................................ 2013-006048

(51) Int. Cl.
| | |
|---|---|
| H01B 1/02 | (2006.01) |
| B01J 19/12 | (2006.01) |
| H01M 8/06 | (2016.01) |
| C01F 7/16 | (2006.01) |
| C01B 3/06 | (2006.01) |

(52) U.S. Cl.
CPC .............. B01J 19/123 (2013.01); C01B 3/061 (2013.01); C01F 7/164 (2013.01); H01M 8/0606 (2013.01); *C01P 2002/72* (2013.01); *C01P 2002/84* (2013.01); *Y02E 60/36* (2013.01)

(58) Field of Classification Search
CPC ... B01J 19/123; H01M 8/0606; C01B 3/061; C01F 7/164
USPC ........................................................ 252/518.1
See application file for complete search history.

(56) References Cited

U.S. PATENT DOCUMENTS

| | | | |
|---|---|---|---|
| 2005/0279279 A1 | 12/2005 | Hosono et al. | |
| 2011/0278509 A1* | 11/2011 | Ito .......................... | C01F 7/164 252/518.1 |
| 2012/0040261 A1 | 2/2012 | Nakanishi et al. | |
| 2013/0183224 A1 | 7/2013 | Hosono et al. | |

FOREIGN PATENT DOCUMENTS

| | | |
|---|---|---|
| EP | 2394959 A1 | 12/2011 |
| EP | 2522633 A1 | 11/2012 |
| JP | 2003-040602 A | 2/2003 |
| JP | 2004-231466 A | 8/2004 |
| JP | 2010-241647 A | 10/2010 |
| JP | 2012-101945 A | 5/2012 |
| WO | WO-03/089373 A1 | 10/2003 |
| WO | WO-2010/095552 A1 | 8/2010 |
| WO | WO-2012/077658 A1 | 6/2012 |

OTHER PUBLICATIONS

STIC search completed May 16, 2016.*
Katsuro Hayashi et al., "Hydride Ion as a Two-Electron Donor in a Nanoporous Crystalline Semiconductor 12CaO•7Al$_2$O$_3$," Journal of Physical Chemistry B, 2005, vol. 109, pp. 23836-23842.
International Search Report mailed Apr. 15, 2014, issued for PCT/JP2014/050207.
Katsuro Hayashi, "Heavy doping of H$^-$ion in 12CaO-7Al2O3," Journal of Solid State Chemistry 184 (2011) pp. 1428-1432.
Supplementary European Search Report dated Jul. 22, 2016, issued for European patent application No. 14740401.

* cited by examiner

*Primary Examiner* — Paul Wartalowicz
(74) *Attorney, Agent, or Firm* — Locke Lord LLP

(57) ABSTRACT

The present invention provides a hydrogen production process, which is capable of producing hydrogen, which is a clean source of energy, simply and conveniently without using conventionally-used ammonia, with an extremely high level of safety. In accordance with the present invention, hydrogen is produced by substituting hydrogen for free oxygen in mayenite ($Ca_{24}Al_{28}O_{64}^{4+}.2O^{2-}$) to obtain hydrogen-substituted mayenite ($Ca_{24}Al_{28}O_{64}^{4+}.4H^-$) and reacting the resultant hydrogen-substituted mayenite ($Ca_{24}Al_{28}O_{64}^{4+}.4H^-$) with water to produce hydrogen, and hydrogen is produced by substituting hydrogen for free oxygen in mayenite ($Ca_{24}Al_{28}O_{64}^{4+}.2O^{2-}$) to obtain hydrogen-substituted mayenite ($Ca_{24}Al_{28}O_{64}^{4+}.4H^-$), irradiating the resultant hydrogen-substituted mayenite ($Ca_{24}Al_{28}O_{64}^{4+}.4H^-$) with ultraviolet rays to obtain conductive mayenite ($Ca_{24}Al_{28}O_{64}^{4+}.4e^-$), and reacting the resultant conductive mayenite ($Ca_{24}Al_{28}O_{64}^{4+}.4e^-$) with water to produce hydrogen.

2 Claims, 5 Drawing Sheets

HYDROGEN PRODUCTION PROCESS

TECHNICAL FIELD

The present invention relates to a hydrogen production process using mayenite having a specific structure.

BACKGROUND ART

In recent years, there have been many proposals to use hydrogen as a clean source of energy. For example, fuel cell automobiles that run on hydrogen as a fuel have been developed. Exhaust gas from hydrogen-powered fuel cells does not contain nitrogen oxides, particulate matters, carbon dioxide, and the like, which exhaust gas from internal-combustion engines contains. Thus, fuel cells draw attention as a clean source of power that is capable of suppressing environmental pollution and global warming.

However, hydrogen is large in volume while being stored, and therefore means for supplying hydrogen is of a problem in, for example, automobile fuel cells.

Patent Document 1 discloses a process of producing hydrogen by decomposing ammonia, etc. Patent Document 1 also describes an apparatus for producing hydrogen for use in a fuel cell having a decomposer that decomposes a hydrogen source composed of ammonia and/or hydrazine into nitrogen and hydrogen through a catalytic reaction, to supply the resultant hydrogen to the fuel cell. Further, Patent Document 2 discloses an apparatus and a process for producing hydrogen efficiently from ammonia, which is an improvement on the invention disclosed in Patent Document 1.

Meanwhile, miniaturizing the fuel cell per se is now in demand. Such a miniaturized fuel cell is intended for use as a substitute for AC-DC converters for rechargeable secondary batteries used in mobile phones, personal digital assistants (PDAs), digital cameras, laptop computers, and the like.

PRIOR ART DOCUMENTS

Patent Document 1: JP-A-2003-40602
Patent Document 2: JP-A-2010-241647

SUMMARY OF THE INVENTION

Problems to be Solved

Unfortunately, the conventional processes of producing hydrogen by catalytic decomposition of ammonia as described in Patent Documents 1 and 2, have a problem in that handling of ammonia is extremely troublesome since ammonia is one of specified offensive odor substances under the Offensive Odor Control Law and is also designated as a deleterious substance in the Poisonous and Deleterious Substances Control Law.

An object of the present invention is to provide a hydrogen production e, which overcomes the problem the above-mentioned conventional technologies face, and is capable of producing hydrogen, which is a clean source of energy, easily and conveniently without using ammonia, with a high level of safety.

Another object of the present invention is to provide a hydrogen production process, by which fuel cells per se that use hydrogen, which is a clean source of energy, can be miniaturized, and therefore are applicable to a fuel cell that can be used as a substitute for AC-DC converters for photoelectric secondary batteries used in mobile phones, PDAs, digital cameras, laptop computers, and the like.

The present inventors had previously filed a patent application on an invention capable of achieving these objects (Japanese Patent Application No. 2012-73980). The present invention is an improvement on the prior invention.

Means for Solving the Problems

To achieve the objects described above, a hydrogen production process of a first aspect in accordance with the present invention is characterized by substituting hydrogen for free oxygen in mayenite $(Ca_{24}Al_{28}O_{64}^{4+}.2O^{2-})$ to obtain hydrogen-substituted mayenite $(Ca_{24}Al_{28}O_{64}^{4+}.4H^-)$, and reacting the resultant hydrogen-substituted mayenite $(Ca_{24}Al_{28}O_{64}^{4+}.4H^-)$ with water to produce hydrogen.

A hydrogen production process of a second aspect in accordance with the present invention is characterized by substituting hydrogen for free oxygen in mayenite $(Ca_{24}Al_{28}O_{64}^{4+}.2O^{2-})$ to obtain hydrogen-substituted mayenite $(Ca_{24}Al_{28}O_{64}^{4+}.4H^-)$, irradiating the resultant hydrogen-substituted mayenite $(Ca_{24}Al_{28}O_{64}^{4+}.4H^-)$ with ultraviolet rays to obtain conductive mayenite $(Ca_{24}Al_{28}O_{64}^{4+}.4e^-)$, and reacting the resultant conductive mayenite $(Ca_{24}Al_{28}O_{64}^{4+}.4e^-)$ with water to produce hydrogen.

Advantageous Effects of the Invention

The hydrogen production process in accordance with the present invention is capable of producing hydrogen, which is a clean source of energy, easily and conveniently without using ammonia. In addition, the hydrogen-substituted mayenite and the conductive mayenite are both non-toxic powdered substances, and are therefore extremely easy to handle and have an very high level of safety.

Further, by the hydrogen production process in accordance with the present invention, fuel cells per se that use hydrogen, which is a clean source of energy, can be miniaturized. Thus, these are applicable to fuel cells that can be used as a substitute for AC-DC converters for rechargeable secondary batteries used in mobile phones, PDAs, digital cameras, laptop computers, and the like.

MODE FOR CARRYING OUT THE INVENTION

A reaction of a first aspect in accordance with the present invention is represented by the following reaction formula.

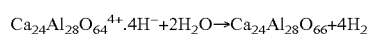
$$Ca_{24}Al_{28}O_{64}^{4+}.4H^- + 2H_2O \rightarrow Ca_{24}Al_{28}O_{66} + 4H_2$$

A reaction of a second aspect in accordance with the present invention is represented by the following reaction formula.

$$Ca_{24}Al_{28}O_{64}^{4+}.4e^- + 2H_2O \rightarrow Ca_{24}Al_{28}O_{66} + 2H_2$$

In the first and second aspects in accordance with the present invention, hydrogen-substituted mayenite may be obtained, for example, by calcining katoite in a hydrogen atmosphere. The calcining temperature is, for example, 500 to 1500° C., more preferably 1000 to 1400° C. The calcining time is determined as appropriate depending on the temperature, which is in the range of 1 minute to 24 hours. Katoite may be synthesized from, for example, aluminum powder and calcium hydroxide using a known process. Hydrogen-substituted mayenite and katoite may also be synthesized using any process other than the above-described one.

Reaction of hydrogen-substituted mayenite or conductive mayenite with water is conducted preferably at a temperature in the range of 0 to 100° C. The reaction time is determined as appropriate depending on the required amount of hydrogen to be produced. The reaction may be conducted at normal pressures or may be conducted under pressure.

In the second aspect of the present invention, hydrogen-substituted mayenite is irradiated with ultraviolet rays, preferably using a low-pressure mercury lamp, with the distance from the lamp to a sample being 1 mm to 10 cm, with the irradiation time being 1 second to 5 hours.

EXAMPLES

Several Examples of the present invention and a Comparative Example to be compared to the Examples of the present invention will be described below. However, the present invention should not be limited to the Examples described below.

Example 1 i) Preparation of Katoite

First, 200 ml of ion-exchanged water was put into a reactor (separable flask) having a capacity of 1 liter. Next, 9 g of aluminum powder (trade name: #150, manufactured by MINALCO. LTD.) and 12 g of calcium hydroxide (manufactured by Wako Pure Chemical Industries Ltd.) were added to the reactor, followed by stirring. After completion of production of hydrogen gas, the ion-exchanged water was filtered, and a solid content obtained by the filtration was dried at a temperature of 70° C. in air. Katoite was thus obtained.

ii) Preparation of Hydrogen-Substituted Mayenite

The resultant katoite was calcined at a temperature of 1300° C. in a hydrogen atmosphere for 2 hours to produce hydrogen-substituted mayenite ($Ca_{24}Al_{28}O_{64}^{4+} \cdot 4H^-$). A sample of the calcined product was subjected to X-ray diffraction measurement using an X-ray diffractometer, MaltiFlex, manufactured by Rigaku Corporation and subjected to measurement of a visible-UV reflectance spectrum using UV3400 manufactured by Shimadzu Corporation.

Figure 1:
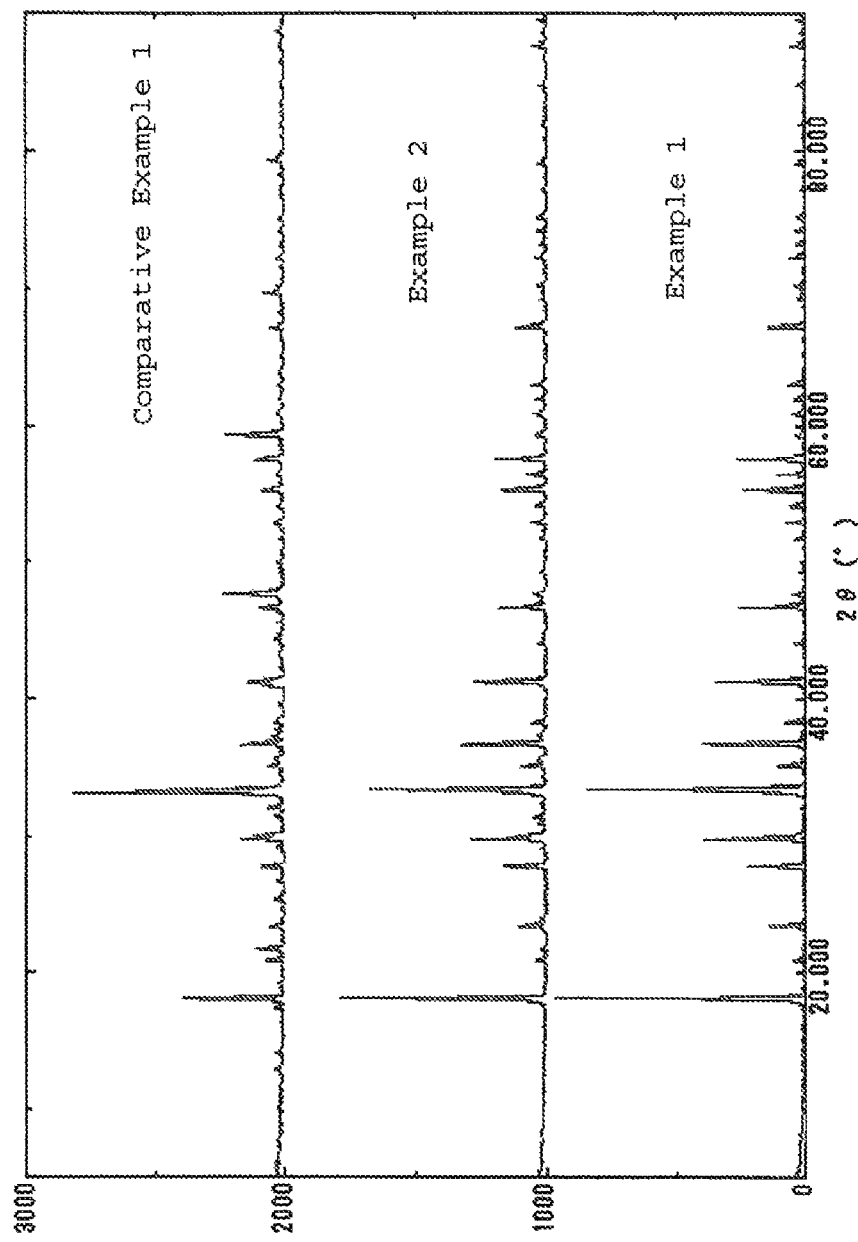
FIG. 1 shows X-ray diffraction results of each sample of Examples 1 and 2, and Comparative Example 1.
Figure 2:
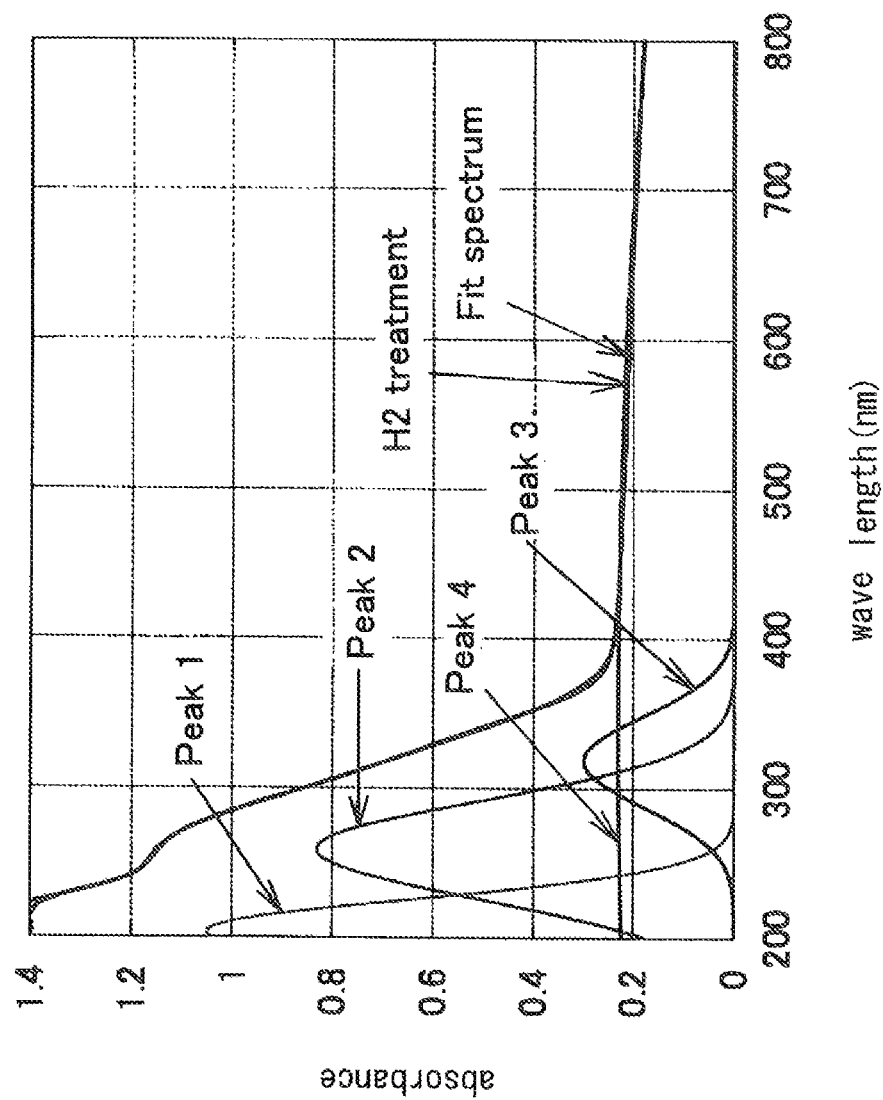
FIG. 2 shows measurement results of a visible-UV reflectance spectrum of the sample of Example 1.

The measurement results of X-ray diffraction are shown in FIG. 1. As seen from FIG. 1, the sample showed peaks characteristic of mayenite, thereby being confirmed to have the structure of mayenite. FIG. 2 shows measurement results of the visible-UV reflectance spectrum. This sample shows a spectrum separated into three components having peaks at positions around 200, 250, and 310 nm, respectively. Compared to a sample of Comparative Example 1 described below, it is noted that this sample has prominent peak intensities particularly at 250 and 310 nm.

iii) Production of Hydrogen

Figure 5:
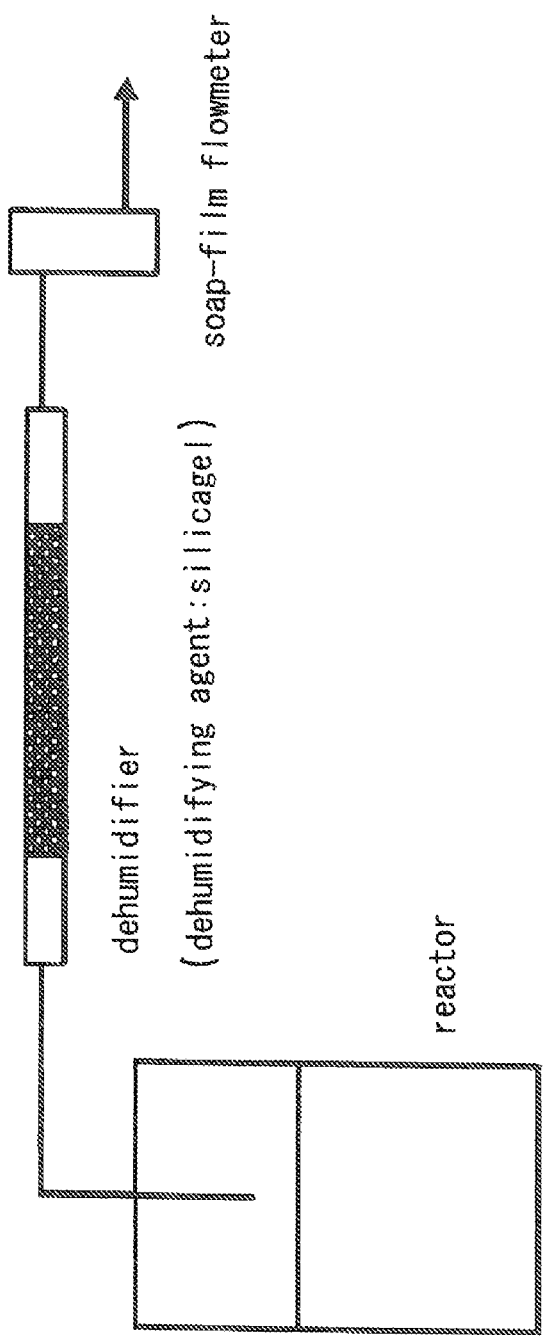
FIG. 5 is a schematic view showing an example of hydrogen production testing equipment in which the hydrogen production process in accordance with the present invention was carried out.

First, 200 ml of ion-exchanged water was put into a reactor (separable flask) having a capacity of 1 liter in hydrogen production testing equipment shown in FIG. 5. Next, 9 g of hydrogen-substituted mayenite obtained by step ii) was added to the reactor and the whole was heated with stirring to maintain the temperature at 55° C.

Hydrogen-substituted mayenite thus reacted with water was caused to generate a gas. The gas was passed through a dehumidifier filled with a silica gel as a dehumidifying agent, followed by removal of its water content. Then, the amount of gas generated was measured with a soap-film flowmeter. The components of the gas generated were analyzed using a thermal conductivity detector (TCD) type gas chromatograph (trade name: GC-8A, manufactured by Shimadzu Corporation). This analysis revealed that the gas generated was hydrogen. The amount of hydrogen gas generated was 80 Nml.

Example 2

Hydrogen-substituted mayenite ($Ca_{24}Al_{28}O_{64}^{4+} \cdot 4H^-$) obtained by step ii) of Example 1 was irradiated with ultraviolet rays to obtain conductive mayenite ($Ca_{24}Al_{28}O_{64}^{4+} \cdot 4e^-$). The ultraviolet irradiation was conducted using a low pressure mercury lamp, with a distance from the lamp to a sample being 6.5 cm, with the irradiation time being 60 minutes.

Conducive mayenite was also subjected to measurement of X-ray diffraction and measurement of a visible-UV reflectance spectrum in the same manner as in step ii) of Example 1.

Figure 3:
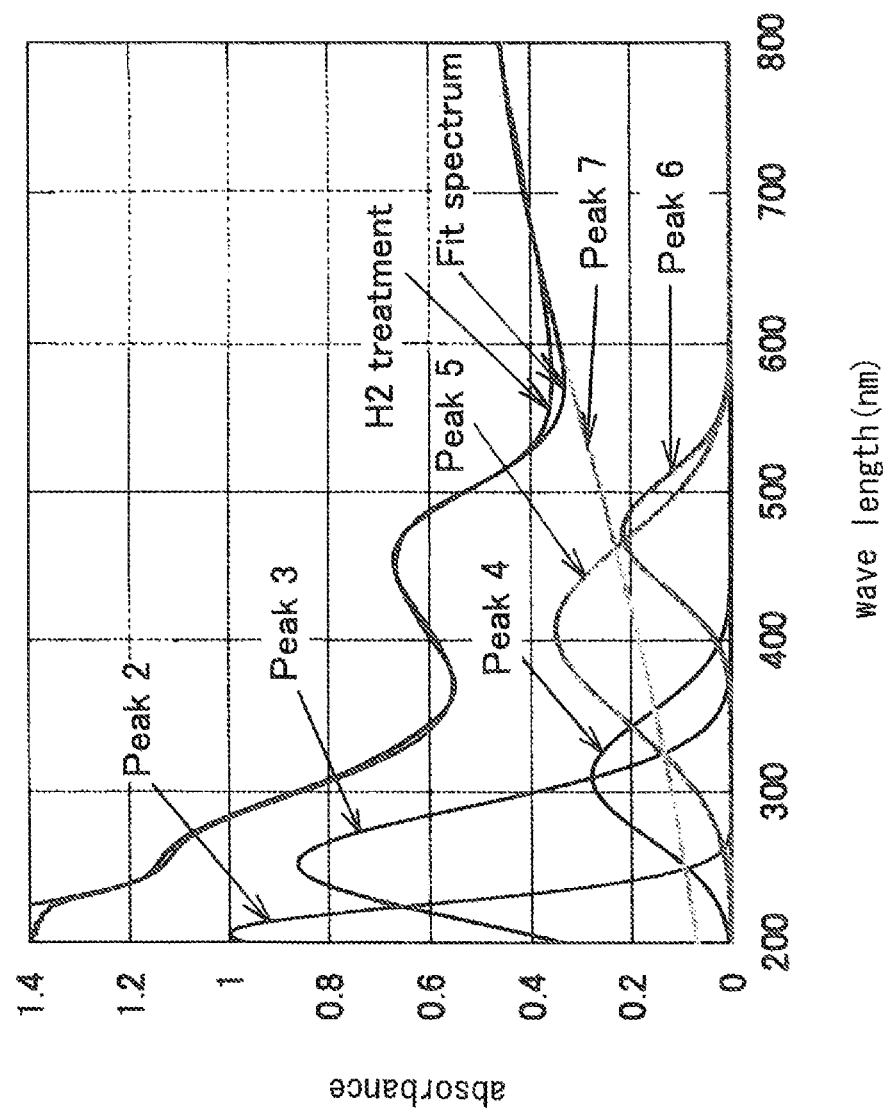
FIG. 3 shows measurement results of a visible-UV reflectance spectrum of the sample of Example 2.

The measurement results of X-ray diffraction are shown in FIG. 1. As seen from FIG. 1, the sample showed peaks characteristic of mayenite, thereby being confirmed to have the structure of mayenite. FIG. 3 shows measurement results of the visible-UV reflectance spectrum. This sample shows a spectrum separated into three components having peaks at positions around 200, 250, and 310 nm, respectively. Compared to the sample of Comparative Example 1 described below, it is noted that this sample has prominent peak intensities particularly at 250 and 310 nm.

The same operation as in step iii) of Example 1 was conducted using the conductive mayenite to generate hydrogen gas. The amount of hydrogen gas generated was 27 Nml.

Comparative Example 1

Katoite obtained from step i) of Example 1 was calcined at a temperature of 1300° C. in air for 2 hours to obtain mayenite ($Ca_{24}Al_{28}O_{66}$).

The resultant mayenite was also subjected to measurement of X-ray diffraction and measurement of a visible-UV reflectance spectrum in the same manner as in step ii) of Example 1.

Figure 4:
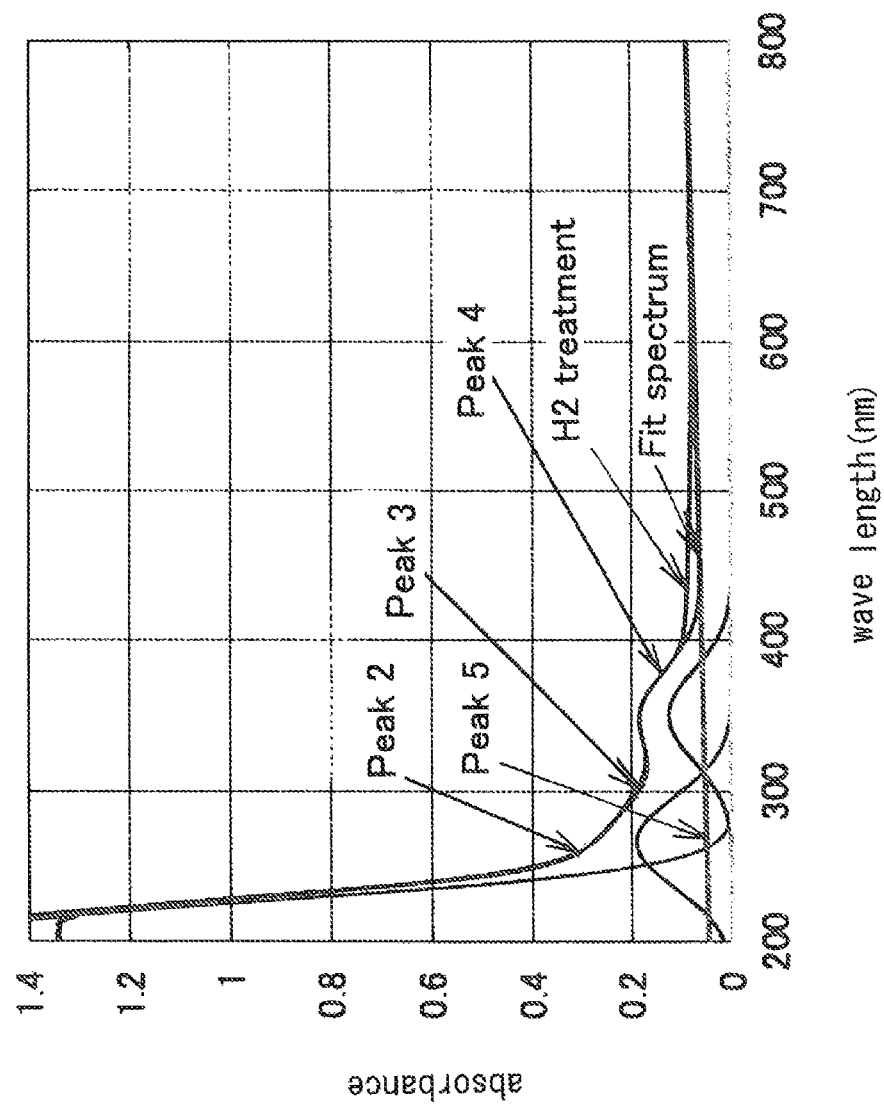
FIG. 4 shows measurement results of a visible-UV reflectance spectrum of the sample of Comparative Example 1.

The measurement results of X-ray diffraction are shown in FIG. 1. As seen from FIG. 1, the sample showed peaks characteristic of mayenite, thereby being confirmed to have the structure of mayenite. FIG. 4 shows measurement results of the visible-UV reflectance spectrum. This sample did not show peaks at positions around 200, 250, and 310 nm, particularly at 250 and 310 nm.

The same operation as in step iii) of Example 1 was conducted using this conductive mayenite to generate hydrogen gas. The amount of hydrogen gas generated was 0 Nml.

Table 1 below shows amounts of hydrogen generated using mayenite of Examples 1 and 2, and Comparative Example 1.

TABLE 1

| Sample | Amount of Hydrogen Generated (Nml) |
|---|---|
| Example 1 | 80 |
| Example 2 | 27 |
| Comparative Example 1 | 0 |

The invention claimed is:

1. A process for producing hydrogen characterized by:
substituting hydrogen for free oxygen in mayenite ($Ca_{24}Al_{28}O_{64}{}^{4+}.2O^{2-}$) to obtain hydrogen-substituted mayenite ($Ca_{24}Al_{28}O_{64}{}^{4+}.4H^{-}$); and
reacting the resultant hydrogen-substituted mayenite ($Ca_{24}Al_{28}O_{64}{}^{4+}.4H^{-}$) with water to produce hydrogen.

2. A process for producing hydrogen characterized by:
substituting hydrogen for free oxygen in mayenite ($Ca_{24}Al_{28}O_{64}{}^{4+}.2O^{2-}$) to obtain hydrogen-substituted mayenite ($Ca_{24}Al_{28}O_{64}{}^{4+}.4H^{-}$);
irradiating the resultant hydrogen-substituted mayenite ($Ca_{24}Al_{28}O_{64}{}^{4+}.4H^{-}$) with ultraviolet rays to obtain conductive mayenite ($Ca_{24}Al_{28}O_{64}{}^{4+}.4e^{-}$); and
reacting the resultant conductive mayenite ($Ca_{24}Al_{28}O_{64}{}^{4+}.4e^{-}$) with water to produce hydrogen.

* * * * *